United States Patent
Harada et al.

(10) Patent No.: US 12,427,925 B2
(45) Date of Patent: Sep. 30, 2025

(54) VEHICULAR CAMERA UNIT

(71) Applicant: SUBARU CORPORATION, Tokyo (JP)

(72) Inventors: Reo Harada, Tokyo (JP); Noriaki Hattori, Tokyo (JP); Kenta Fukuma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 89 days.

(21) Appl. No.: 18/374,287

(22) Filed: Sep. 28, 2023

(65) Prior Publication Data

US 2024/0116446 A1 Apr. 11, 2024

(30) Foreign Application Priority Data

Oct. 7, 2022 (JP) ................. 2022-162798

(51) Int. Cl.
*B60R 1/25* (2022.01)
*B60R 11/00* (2006.01)
*B60R 11/04* (2006.01)

(52) U.S. Cl.
CPC ............... *B60R 1/25* (2022.01); *B60R 11/04* (2013.01); *B60R 2011/0094* (2013.01); *B60R 2300/10* (2013.01)

(58) Field of Classification Search
None
See application file for complete search history.

(56) References Cited

U.S. PATENT DOCUMENTS

| | | | |
|---|---|---|---|
| 2008/0304705 A1* | 12/2008 | Pomerleau | B60R 1/26 348/148 |
| 2016/0026881 A1* | 1/2016 | Broggi | B60R 11/04 348/47 |
| 2020/0112657 A1* | 4/2020 | Stein | H04N 23/90 |
| 2024/0208432 A1* | 6/2024 | Hoffmann | B60R 1/1207 |

FOREIGN PATENT DOCUMENTS

| | | |
|---|---|---|
| JP | 2009-286216 A | 12/2009 |
| JP | 2017-222307 A | 12/2017 |

* cited by examiner

*Primary Examiner* — Rebecca A Volentine
(74) *Attorney, Agent, or Firm* — TROUTMAN PEPPER LOCKE LLP (57) ABSTRACT

A vehicular camera unit includes a camera housing, an oblique forward-facing camera, and an oblique rearward-facing camera. The camera housing is attached to a side of a vehicle. The oblique forward-facing camera is provided in the camera housing. The oblique rearward-facing camera is provided in the camera housing. The oblique rearward-facing camera is disposed forward of the oblique forward-facing camera and on an outer side of the oblique forward-facing camera in a vehicle width direction of the vehicle.

20 Claims, 6 Drawing Sheets

VEHICULAR CAMERA UNIT

CROSS-REFERENCE TO RELATED APPLICATION

The present application claims priority from Japanese Patent Application No. 2022-162798 filed on Oct. 7, 2022, the entire contents of which are hereby incorporated by reference.

BACKGROUND

The disclosure relates to a vehicular camera unit configured to be provided on a vehicle.

In recent years, vehicles are provided with cameras for photographing travel environments on right and left sides, a rear side, and so on of the vehicle, in addition to a camera that photographs a travel environment on a front side of the vehicle. Such cameras photograph conditions surrounding a vehicle and provide the photographic images to a driver who drives the vehicle. Moreover, vehicles that are mounted with a driving support device have also been developed. The driving support device supports driving by using photographic images of surroundings taken by cameras.

Cameras that are thus provided in vehicles have their views obstructed by dust, waterdrops, etc., adhering to the lenses. Driving support devices are configured so that their operations will be forcibly terminated when cameras have poor visibility. In consideration of this, various techniques for making cameras continuously have good visibility have been developed.

In one example, Japanese Unexamined Patent Application Publication No. 2009-286216 discloses a wind pressure generator for removing dust, waterdrops, etc., that obstruct the field of view of a camera. In another example, Japanese Unexamined Patent Application Publication No. 2017-222307 discloses an on-board imaging device that appropriately removes waterdrops adhering to a lens of a camera.

These existing wind pressure generator and on-board imaging device are based on a technique of generating wind pressure in the vicinity of a lens of a camera to reduce dirt adhering to the lens.

SUMMARY

An aspect of the disclosure provides a vehicular camera unit including a camera housing, an oblique forward-facing camera, and an oblique rearward-facing camera. The camera housing is attached to a side of a vehicle. The oblique forward-facing camera is provided in the camera housing. The oblique rearward-facing camera is provided in the camera housing. The oblique rearward-facing camera is disposed forward of the oblique forward-facing camera and on an outer side of the oblique forward-facing camera in a vehicle width direction of the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Existing wind pressure generator and on-board imaging device are mounted on a side mirror, and a wiping mechanism or a movable mechanism is provided in the side mirror in order to improve the field of view of a camera. Unfortunately, this technique makes the vehicle have a complicated structure due to the wiping mechanism or the movable mechanism provided in the side mirror, which causes an increase in the number of steps in a production line and also causes high manufacturing cost.

In view of this, it is desirable to provide a vehicular camera unit that prevents raindrops and other dirt from adhering to a camera, without having a wiping mechanism, a movable mechanism, or the like. This feature enables a driving support operation to be performed for a long time and also enables reducing manufacturing cost of a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
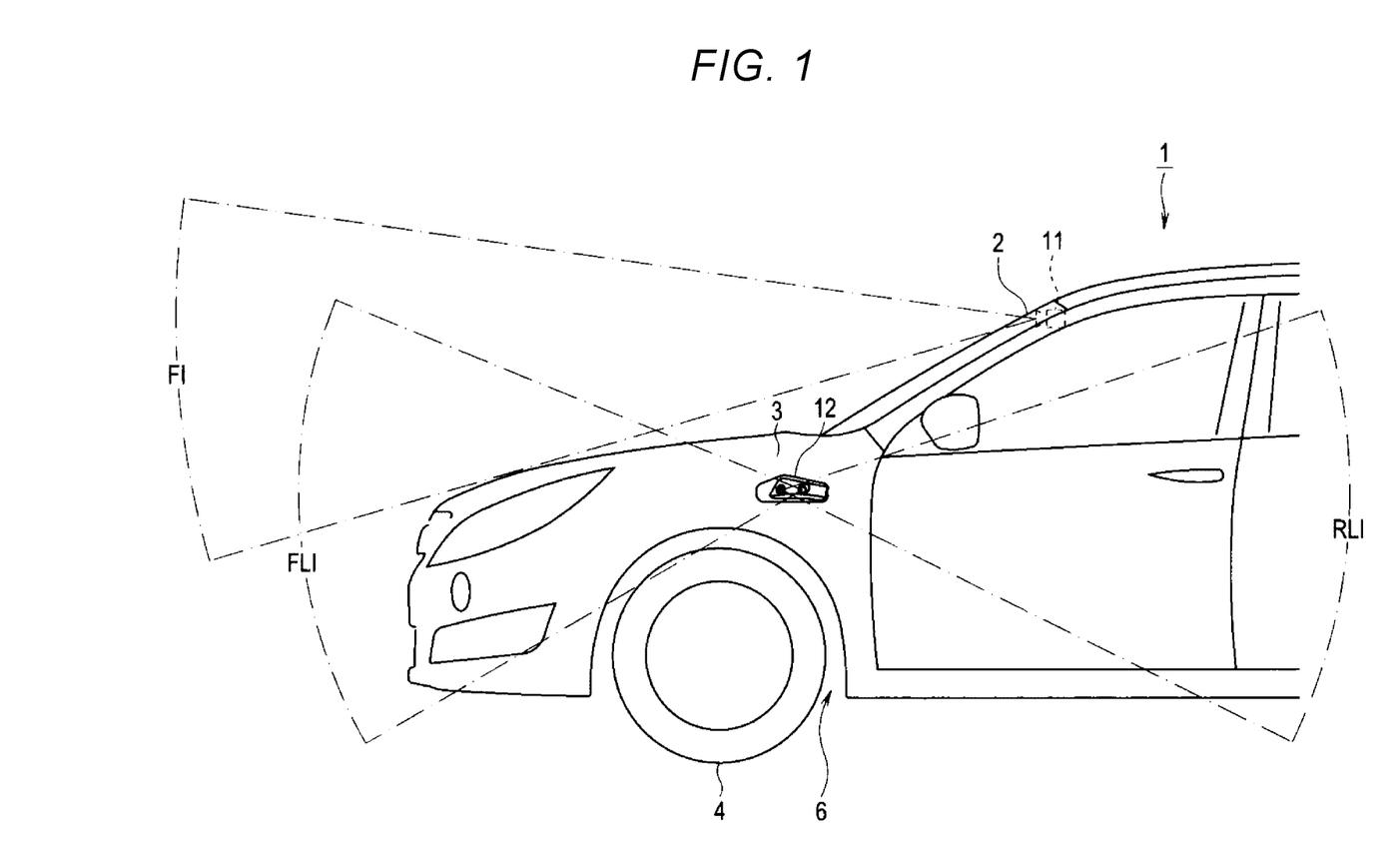
FIG. 1 is a side view illustrating a front part of a vehicle provided with vehicular camera units.
Figure 2:
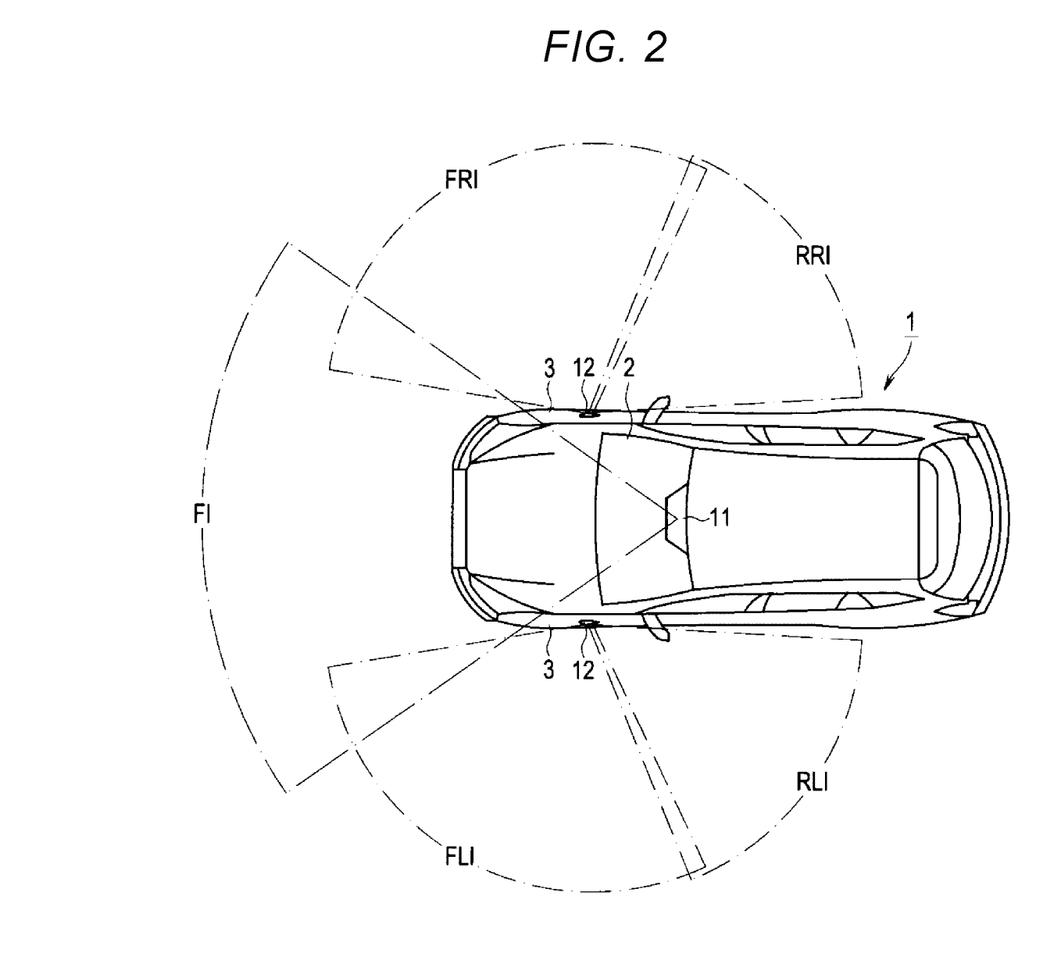
FIG. 2 is a top view of the vehicle provided with the vehicular camera units.

As illustrated in FIGS. 1 and 2, a vehicle 1 includes a front camera unit 11 and two oblique-forward and oblique rearward-facing camera units 12. The oblique-forward and oblique rearward-facing camera unit 12 is simply referred to as a "side camera unit 12", hereinafter.

The front camera unit 11 is an imaging unit for recognizing a travel environment on a front side. On the other hand, the two side camera units 12 are imaging units for recognizing travel environments on right and left oblique forward sides and on right and left oblique rearward sides.

The front camera unit 11 is fixed in proximity to a windshield 2, at an upper position of a front part in a vehicle cabin of the vehicle 1. Herein, the front camera unit 11 is a stereo camera unit having two cameras, for example. The front camera unit 11 obtains a stereographic image of a front region FI of the vehicle 1. The type of the front camera unit 11 is not limited to a stereo camera and may be a monocular camera.

The two side camera units 12, which are vehicular camera units of this embodiment, are provided in a protruding manner, to front fenders 3 disposed to right and left sides of the vehicle 1. That is, the two side camera units 12 are disposed to the right and left front fenders 3 so as to protrude outward in the vehicle width direction of the vehicle 1. In more detail, the two side camera units 12 are placed on the front fenders 3 above wheelhouses 6 in which front wheels 4 are housed and disposed.

The side camera unit 12 that is provided in the right front fender 3 obtains images of a right oblique forward region FRI and a right oblique rearward region RRI of the vehicle 1. The side camera unit 12 that is provided in the left front fender 3 obtains images of a left oblique forward region FLI and a left oblique rearward region RLI of the vehicle 1.

Herein, the structure of the side camera unit 12 will be detailed below. The following describes an example of the structure of the side camera unit 12 provided in the left front fender 3. The structure of the side camera unit 12 that is provided in the right front fender 3 and the structure of the side camera unit 12 on the left side are symmetric in the right-left direction, and therefore, detailed description thereof is omitted.

Figure 3:
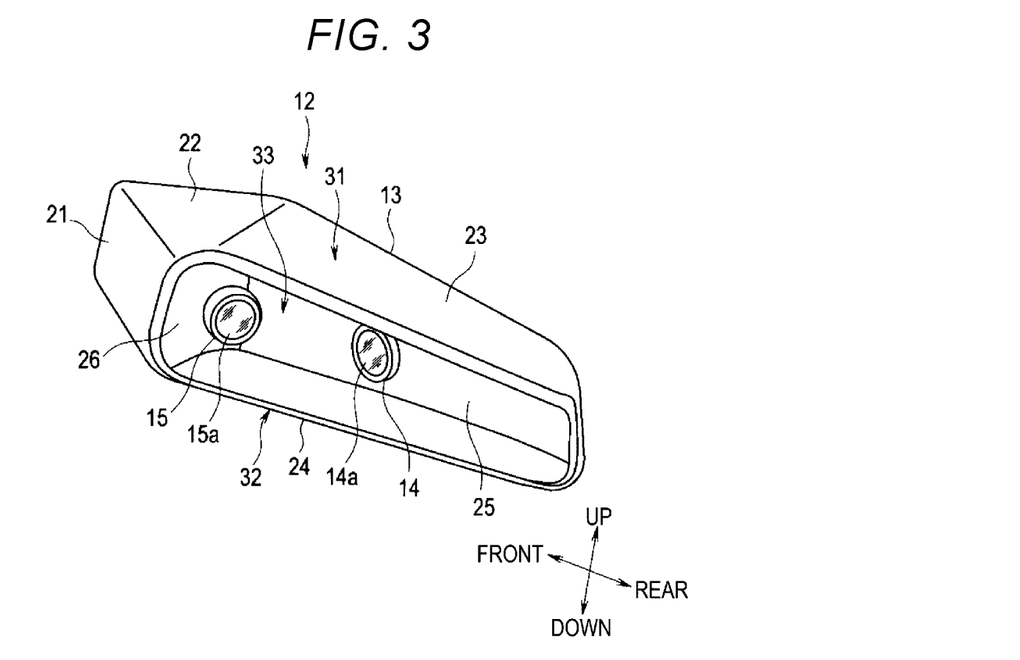
FIG. 3 is a perspective view illustrating a structure of the vehicular camera unit.
Figure 4:
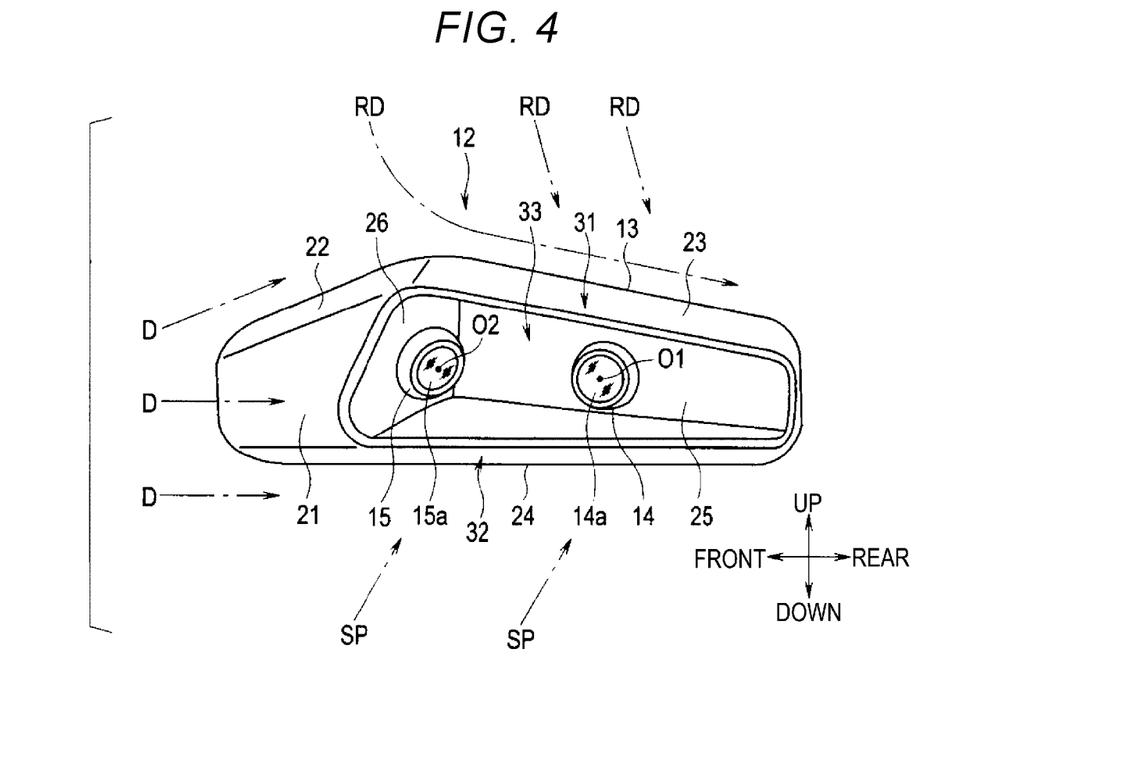
FIG. 4 is a side view illustrating the structure of the vehicular camera unit.

The side camera unit 12 includes a camera housing 13, which is an exterior component, an oblique forward-facing camera 14, and an oblique rearward-facing camera 15, as illustrated in FIGS. 3 and 4. That is, the side camera unit 12 is a camera assembly as one unit component in which the two cameras 14 and 15 are provided in the camera housing 13.

The oblique forward-facing camera 14 is provided rearward of the oblique rearward-facing camera 15 in the vehicle 1. In other words, the oblique rearward-facing camera 15 and the oblique forward-facing camera 14 are successively provided in the camera housing 13 in such a manner that the oblique rearward-facing camera 15 is on a front side of the vehicle 1 and that the oblique forward-facing camera 14 is on a rear side of the vehicle 1.

The camera housing 13 includes a front side surface 21, a front upper surface 22, a rear upper surface 23, and a lower surface 24. The camera housing 13 also includes a side surface 25 that is disposed with the oblique forward-facing camera 14, and a rearward-facing surface 26 that is provided with the oblique rearward-facing camera 15.

The oblique forward-facing camera 14 is disposed to the side surface 25 of the camera housing 13 in such a manner that a lens 14a slightly faces oblique forward of the vehicle 1. This oblique forward-facing camera 14 has a predetermined angle of view and photographs the left oblique forward region FLI. The oblique forward-facing camera 14 may be provided in the camera housing 13 so as to face a lateral direction along the vehicle width direction of the vehicle 1.

The oblique rearward-facing camera 15 is disposed to the rearward-facing surface 26 of the camera housing 13 while a lens 15a is directed in an oblique rearward direction of the vehicle 1. This oblique rearward-facing camera 15 has a predetermined angle of view and photographs the left oblique rearward region RLI.

The camera housing 13 includes an eave-shaped upper hood 31, which has the rear upper surface 23 on an upper side, and also includes an eave-shaped lower hood 32, which has the lower surface 24 on a lower side. These upper hood 31 and lower hood 32 extend outward in the vehicle width direction of the vehicle 1. Thus, the camera housing 13 has a recess 33 that is defined by the side surface 25, the rearward-facing surface 26, the upper hood 31, and the lower hood 32.

In the camera housing 13, the oblique forward-facing camera 14 and the oblique rearward-facing camera 15 are disposed so as to be contained in the recess 33. In more detail, the oblique forward-facing camera 14 and the oblique rearward-facing camera 15 are disposed in the recess 33 of the camera housing 13, in such a manner that their upper sides are covered by the upper hood 31 and their lower sides are covered by the lower hood 32.

That is, the oblique forward-facing camera 14 and the oblique rearward-facing camera 15 are provided between the upper hood 31 and the lower hood 32 in the upper-lower direction. The upper hood 31 and the lower hood 32 protrude outward in the vehicle width direction, in such a manner as to cover the lens 14a of the oblique forward-facing camera 14 and the lens 15a of the oblique rearward-facing camera 15.

The front side surface 21 is positioned on a side of a front part of the camera housing 13 and has an inclined surface that is inclined outward in the vehicle width direction of the vehicle 1 by a predetermined angle, from the front side toward the rear side of the vehicle 1.

The front upper surface 22 is positioned on an upper side of the front part of the camera housing 13 and has an inclined surface that is inclined upward of the vehicle 1 by a predetermined angle, from the front side toward the rear side of the vehicle 1.

Figure 5:
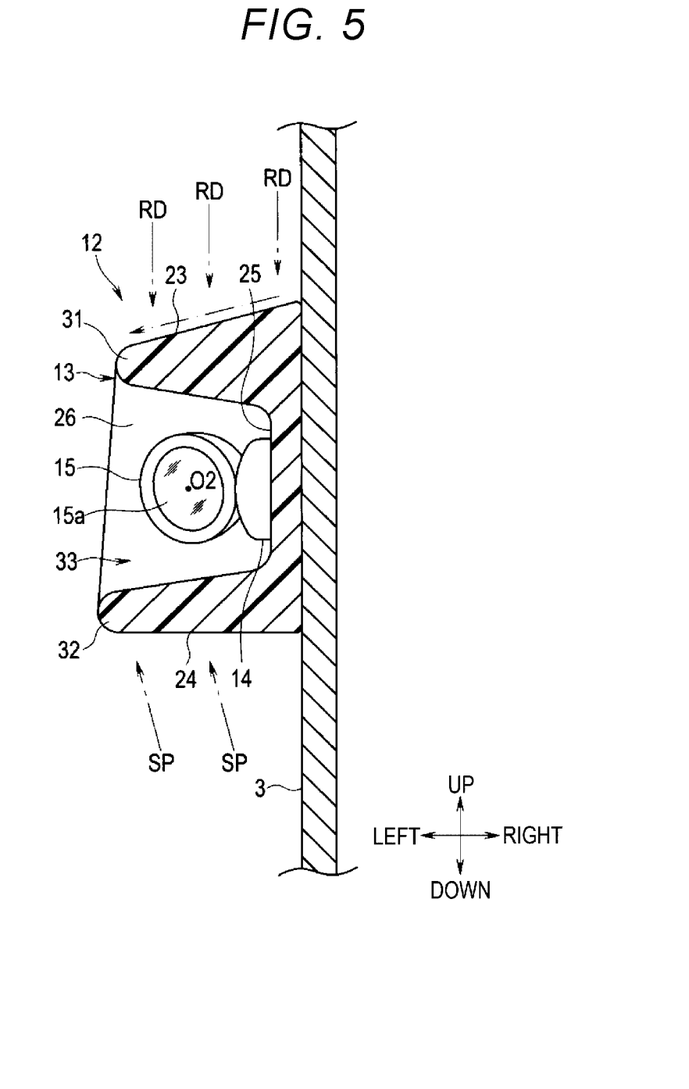
FIG. 5 is a vertical sectional view illustrating the structure of the vehicular camera unit mounted to a front fender.

The rear upper surface 23 is positioned on an upper side from a middle part to a rear part of the camera housing 13 and has an inclined surface that is inclined downward of the vehicle 1 by a predetermined angle, from the front side toward the rear side of the vehicle 1. The inclined surface of the rear upper surface 23 is also inclined downward to an outer side in the vehicle width direction of the vehicle 1, as illustrated in FIG. 5.

That is, the upper hood 31 has the inclined rear upper surface 23 that is inclined downward from the front side toward the rear side of the vehicle 1 and to the outer side in the vehicle width direction of the vehicle 1. The lower surface 24 of the camera housing 13 is a surface approximately parallel in the front-rear direction of the vehicle 1, from the front side toward the rear side of the vehicle 1.

Figure 6:
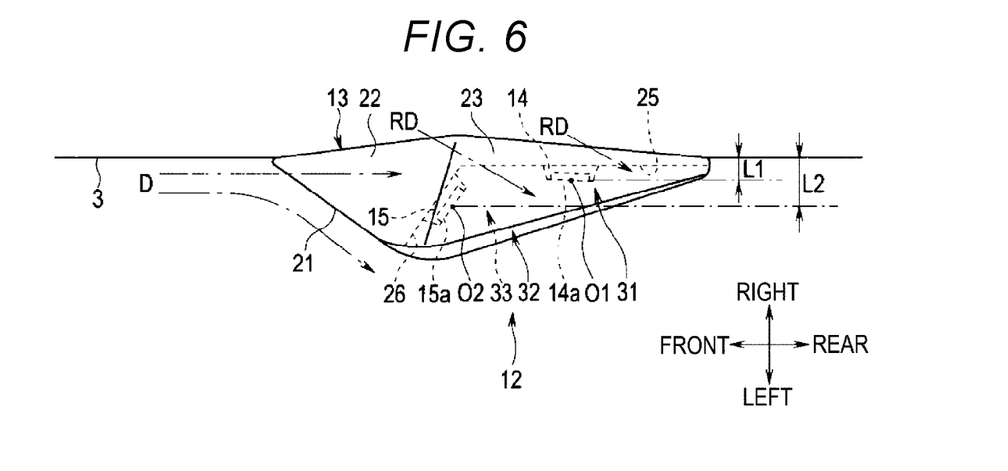
FIG. 6 is a top view illustrating the structure of the vehicular camera unit mounted to the front fender.
Figure 7:
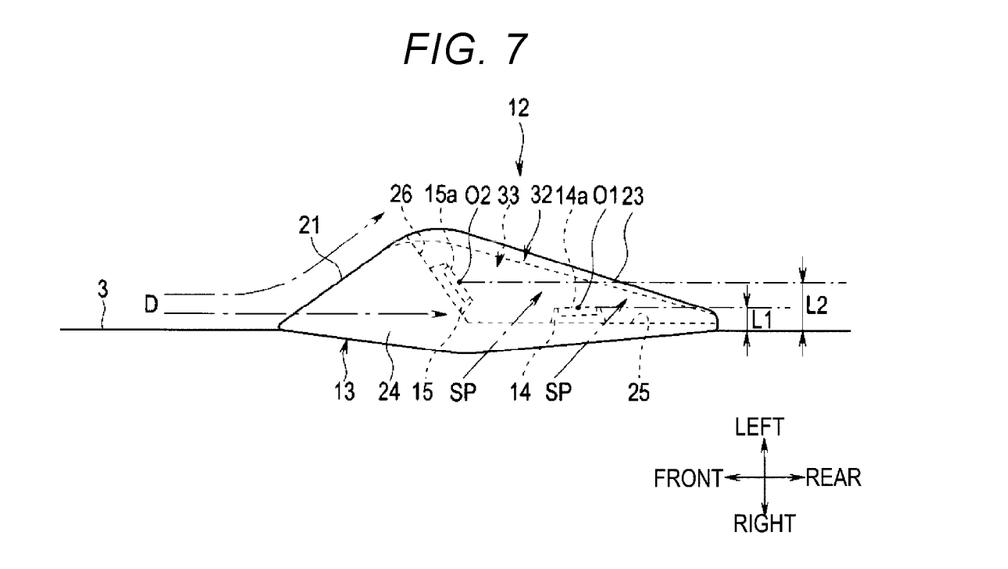
FIG. 7 is a bottom view illustrating the structure of the vehicular camera unit mounted to the front fender.

The oblique rearward-facing camera 15 is disposed in the recess 33 of the camera housing 13 so as to be on an outer side of the oblique forward-facing camera 14 in the vehicle width direction of the vehicle 1, as illustrated in FIGS. 6 and 7.

In one example, the oblique forward-facing camera 14 is provided so that the center (principal point) O1 of the lens 14a will be at a position separated from the front fender 3 to the outer side in the vehicle width direction of the vehicle 1 by a predetermined distance L1. On the other hand, the oblique rearward-facing camera 15 is provided so that the center (principal point) O2 of the lens 15a will be at a position separated from the front fender 3 to the outer side in the vehicle width direction of the vehicle 1 by a predetermined distance L2.

That is, in order to contain the rear side that is a side opposite to an advancing direction of the vehicle 1 (by 180 degrees), in the angle of view, the oblique rearward-facing camera 15 is protruded outward in the vehicle width direction of the vehicle 1 from the surface of the front fender 3. On the other hand, due to use of the front camera unit 11, the front side in the vehicle advancing direction (0 degrees) may not be contained in the angle of view, and therefore, the oblique forward-facing camera 14 may not be protruded outward in the vehicle width direction of the vehicle 1.

Figure 8:
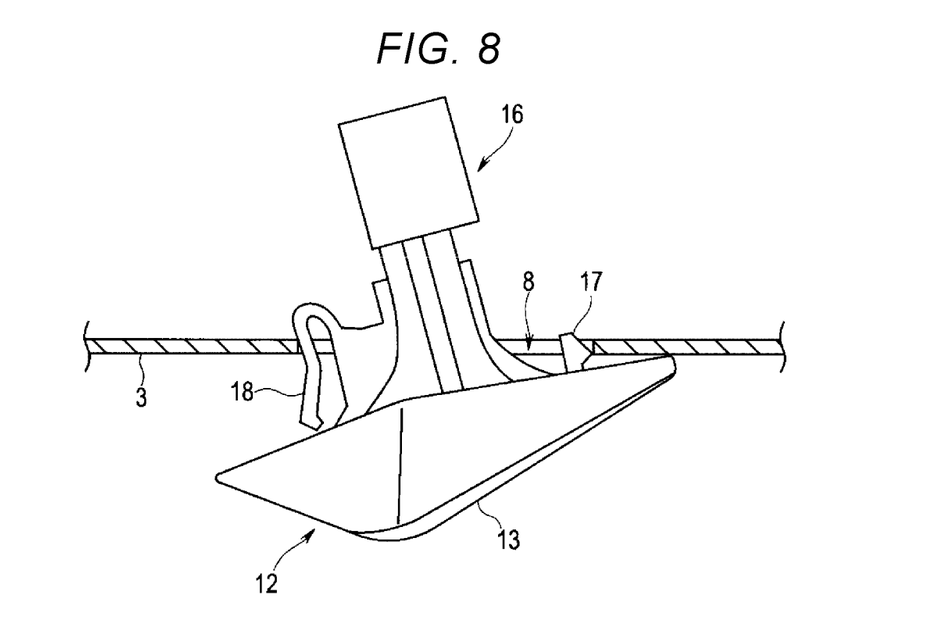
FIG. 8 is a view illustrating a state in which the vehicular camera unit is being attached to the front fender by a snap-fit mechanism.
Figure 9:
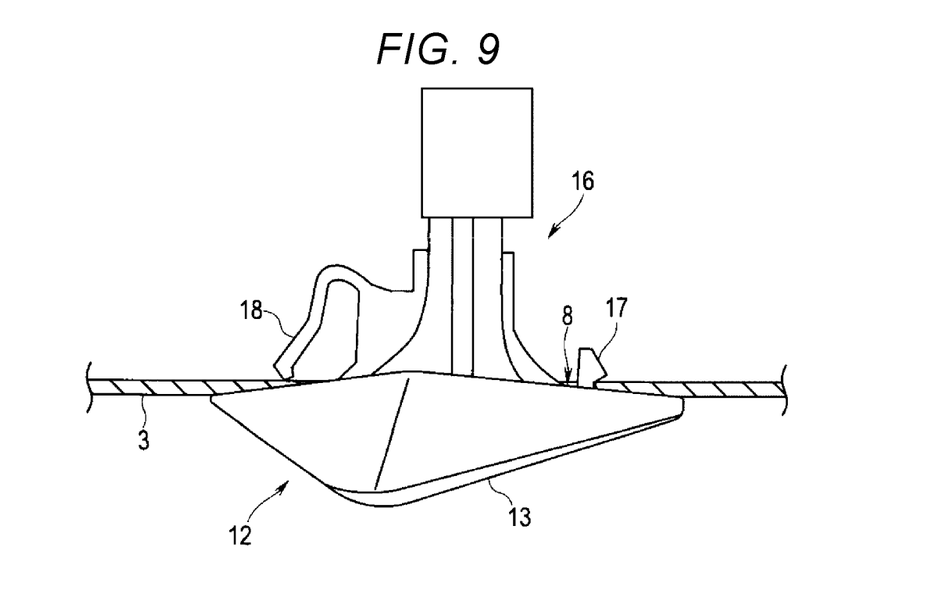
FIG. 9 is a view illustrating a state in which the vehicular camera unit is attached to the front fender by the snap-fit mechanism.

The side camera unit 12 is fitted by using a snap-fit mechanism in assembling to the front fender 3. As illustrated in FIGS. 8 and 9, the side camera unit 12 includes a connector 16 that is attached to the camera housing 13. The connector 16 includes a terminal such as a coupler, a rigid claw 17, and a flexible claw 18.

In the side camera unit 12, the terminal of the connector 16 is first coupled to terminals on the vehicle 1 side, such as of a power cable and an imaging cable (not illustrated). Then, the connector 16 of the side camera unit 12 is inserted into a hole 8 that is formed in the front fender 3.

At this time, the side camera unit 12 is inserted into the hole 8 from the connector 16 side by tilting so that the rigid claw 17 of the connector 16 will be caught by a rim inner wall that forms the hole 8 of the front fender 3.

Thereafter, the side camera unit 12 is pushed into the hole 8 toward the front fender 3, and the flexible claw 18 is deformed to be bent toward the connector 16 when passing through the hole 8. The deformed flexible claw 18 completely enters the inside of the front fender 3 and returns to its original state after passing through the hole 8.

An end of the flexible claw 18 then abuts on an inner surface of the front fender 3, whereby the side camera unit 12 is held and fixed to the front fender 3. In this manner, the side camera unit 12 is attached to the front fender 3. In attaching the side camera unit 12 to the front fender 3, a waterproof seal or the like (not illustrated) for ensuring watertightness is provided thereto.

The above-described side camera unit 12, in which the oblique forward-facing camera 14 and the oblique rearward-facing camera 15 are disposed to the camera housing 13 as one camera unit, is mounted to the front fender 3. The oblique rearward-facing camera 15 is disposed forward of the oblique forward-facing camera 14 in the vehicle 1.

In this manner, in the side camera unit 12, the oblique forward-facing camera 14 and the oblique rearward-facing camera 15 are assembled into one camera unit. This structure enables reducing the number of steps in an assembling line of the vehicle 1 and also enables decreasing an amount of changes to peripheral components due to addition of components.

The oblique rearward-facing camera 15 of the side camera unit 12 is provided in the camera housing 13 so as to be on the outer side of the oblique forward-facing camera 14, in the vehicle width direction of the vehicle 1. In more detail, an optical axis of the angle of view of the oblique rearward-facing camera 15, which faces the oblique rearward direction of the vehicle 1, passes the center (principal point) O2 of the lens 15a, whereas an optical axis of the angle of view of the oblique forward-facing camera 14 passes the center (principal point) O1 of the lens 14a. The center O2 is positioned on an outer side of the center O1 in the vehicle width direction of the vehicle 1.

Thus, this structure of the side camera unit 12 reduces adhesion of dirt (refer to arrows D in FIGS. 4, 6, and 7), such as raindrops (waterdrops) and dust, which come from the front side of the vehicle 1 and can cause poor visibility, to the lenses 14a and 15a of the oblique forward-facing camera 14 and the oblique rearward-facing camera 15. In this manner, arrangement of the oblique forward-facing camera 14 and the oblique rearward-facing camera 15 of the side camera unit 12 prevents dirt, such as raindrops and dust, which can cause poor visibility, from adhering to the lenses 14a and 15a of the oblique forward-facing camera 14 and the oblique rearward-facing camera 15.

The side camera unit 12 is provided with the front side surface 21 at the front part of the camera housing 13. The front side surface 21 has the inclined surface that is inclined outward in the vehicle width direction of the vehicle 1. Thus, in the side camera unit 12, dirt (arrows D), such as raindrops and dust, which come from the front side of the vehicle 1, flows to the outer side in the vehicle width direction along the surface of the front side surface 21. This reduces adhesion of dirt, such as raindrops and dust, which can cause poor visibility, to the lenses 14a and 15a of the oblique forward-facing camera 14 and the oblique rearward-facing camera 15.

The side camera unit 12 is also provided with the front upper surface 22 at the front part of the camera housing 13. The front upper surface 22 has the inclined surface that is inclined upward of the vehicle 1. Thus, in the side camera unit 12, dirt (arrows D), such as raindrops and dust, which come from the front side of the vehicle 1 and can cause poor visibility, flows upward along the surface of the front upper surface 22. This reduces adhesion of dirt, such as raindrops and dust, which can cause poor visibility, to the lenses 14a and 15a of the oblique forward-facing camera 14 and the oblique rearward-facing camera 15.

The side camera unit 12 is also provided with the upper hood 31 that includes the rear upper surface 23. The rear upper surface 23 has the inclined surface that is inclined downward of the vehicle 1 from the middle part to the rear part of the camera housing 13 and that is also inclined downward in the vehicle width direction. Thus, in the side camera unit 12, dirt (refer to arrows RD in FIGS. 4 to 7), such as raindrops and dust, which come from the upper side of the vehicle 1, flows to the rear side of the vehicle 1 and the outer side in the vehicle width direction along the surface of the rear upper surface 23 of the upper hood 31.

The rear upper surface 23, which is the upper surface of the eave-shaped upper hood 31 and is at an upper part of the camera housing 13, is inclined rearward and outward of the vehicle 1. This also makes rainwater that falls along the surface from above of the front fender 3, or the like, flow to the rear side and the outer side of the vehicle 1. This reduces adhesion of dirt, which can cause poor visibility, to the lenses 14a and 15a of the oblique forward-facing camera 14 and the oblique rearward-facing camera 15.

The side camera unit 12 is also provided with the lower hood 32 at a lower part of the camera housing 13. The lower hood 32 has the lower surface 24. Thus, in the side camera unit 12, the lower surface 24 of the lower hood 32 blocks dirt (refer to arrows SP in FIGS. 4 to 7), such as rainwater and mud, which come from the lower side due to being splashed or caught up by the front wheel 4 of the vehicle 1 or due to other causes. This reduces adhesion of dirt, which can cause poor visibility, to the lenses 14a and 15a of the oblique forward-facing camera 14 and the oblique rearward-facing camera 15.

In this manner, the shape of the camera housing 13 of the side camera unit 12 prevents the lenses 14a and 15a of the oblique forward-facing camera 14 and the oblique rearward-facing camera 15 from being attached with dirt, such as raindrops, dust, rainwater, and mud, which come from the front side and the upper side of the vehicle 1 or is splashed or caught up by the front wheel 4 and which can cause poor visibility. In short, the shape of the camera housing 13 of the side camera unit 12 reduces entering of dirt, such as raindrops, dust, rainwater, and mud, to the lenses 14a and 15a of the oblique forward-facing camera 14 and the oblique rearward-facing camera 15.

As described above, the side camera unit 12 has a structure in which dirt, which can cause poor visibility, hardly adheres to the oblique forward-facing camera 14 and the oblique rearward-facing camera 15. Thus, the vehicle 1 does not easily have interruption of a driving support operation, which occurs due to poor visibility of the oblique forward-facing camera 14 and the oblique rearward-facing camera 15 provided in the side camera unit 12.

In addition, the side camera unit 12 enables the oblique forward-facing camera 14 and the oblique rearward-facing camera 15 to continuously have good visibility, without having a wiping mechanism or a movable mechanism as in existing techniques. Moreover, the side camera unit 12, which does not have a wiping mechanism or a movable mechanism as in existing techniques, is not complicated in structure, which makes it possible to prevent an increase in the number of steps in a production line of the vehicle 1 and to reduce manufacturing cost of the vehicle 1.

Thus, the side camera unit 12, which is a vehicular camera unit of this embodiment, enables preventing raindrops and other dirt from adhering to the camera without having a wiping mechanism, a movable mechanism, or the like as in existing techniques. This feature makes the driving support operation be performed for a long time and can reduce manufacturing cost of the vehicle 1. The side camera unit 12 of the vehicle 1 may have one of the upper hood 31 and the lower hood 32 at the camera housing 13. In other words, the oblique forward-facing camera 14 and the oblique rearward-facing camera 15 may be covered at the upper sides by the upper hood 31, or instead, the oblique forward-facing camera 14 and the oblique rearward-facing camera 15 may be covered at the lower sides by the lower hood 32.

The disclosure described in relation to the foregoing embodiment is not limited thereto, and moreover, various modifications can be made within a range not departing from the gist of the disclosure in a practice stage. Furthermore, the above-described embodiment includes techniques in various levels of stages, and each type of technique can be derived by appropriately combining the elements disclosed herein.

For example, in a case in which the above-described problems are solved and the above-described effects are obtained even if some elements are removed from all elements described in relation to the embodiment, the structure or the configuration from which the elements are removed can be derived as a technique of the disclosure.

The invention claimed is:

1. A vehicular camera unit comprising:
a camera housing attached to a side of a front fender of a vehicle;
an oblique forward-facing camera provided in the camera housing; and
an oblique rearward-facing camera provided in the camera housing, the oblique rearward-facing camera being disposed forward of the oblique forward-facing camera and on an outer side of the oblique forward-facing camera in a vehicle width direction of the vehicle,
wherein a first principal point of a lens of the oblique rearward-facing camera and a second principal point of a lens of the oblique forward-facing camera are disposed outward from the front fender in the vehicle width direction, and
wherein a distance from the first principal point to the front fender in the vehicle width direction is greater than a distance from the second principal point to the front fender in the vehicle width direction.

2. The vehicular camera unit according to claim 1, wherein the camera housing comprises a hood that protrudes outward in the vehicle width direction so as to cover one or both of (i) an upper side of the oblique forward-facing camera and an upper side of the oblique rearward-facing camera and (ii) a lower side of the oblique forward-facing camera and a lower side of the oblique rearward-facing camera.

3. The vehicular camera unit according to claim 2, wherein
the camera housing further comprises:
a front side surface that is inclined outward in the vehicle width direction from a front side to a rear side; and
a front upper surface that is inclined upward from the front side to the rear side.

4. The vehicular camera unit according to claim 2, wherein
the hood comprises an upper hood that protrudes outward in the vehicle width direction so as to cover the upper side of the oblique forward-facing camera and the upper side of the oblique rearward-facing camera, and
the upper hood comprises an inclined surface that is inclined downward from a front side to a rear side.

5. The vehicular camera unit according to claim 4, wherein the inclined surface is inclined downward to the outer side in the vehicle width direction.

6. The vehicular camera unit according to claim 5, wherein
the camera housing further comprises:
a front side surface that is inclined outward in the vehicle width direction from the front side to the rear side; and
a front upper surface that is inclined upward from the front side to the rear side.

7. The vehicular camera unit according to claim 4, wherein
the camera housing further comprises:
a front side surface that is inclined outward in the vehicle width direction from the front side to the rear side; and
a front upper surface that is inclined upward from the front side to the rear side.

8. The vehicular camera unit according to claim 4, wherein the upper hood is an eave-shaped upper hood.

9. The vehicular camera unit according to claim 8, wherein the eave-shaped upper hood comprises a front upper surface that is inclined upward from the front side to the rear side and connected to the inclined surface.

10. The vehicular camera unit according to claim 4, wherein the hood further comprises a lower hood that protrudes outward in the vehicle width direction so as to cover the lower side of the oblique forward-facing camera and the lower side of the oblique rearward-facing camera.

11. The vehicular camera unit according to claim 10, wherein the upper hood is an eave-shaped upper hood, and wherein the lower hood is an eave-shaped lower hood.

12. The vehicular camera unit according to claim 11, wherein the eave-shaped upper hood comprises a front upper surface that is inclined upward from the front side to the rear side and connected to the inclined surface.

13. The vehicular camera unit according to claim 1, wherein
the camera housing further comprises:
a front side surface that is inclined outward in the vehicle width direction from a front side to a rear side; and
a front upper surface that is inclined upward from the front side to the rear side.

14. The vehicular camera unit according to claim 1, wherein the camera housing comprises:
- a side surface extending along the front fender and facing outward in the vehicle width direction;
- a rearward-facing surface (i) connected to a front edge of the side surface in a front-rear direction and (ii) extending outward in the vehicle width direction from the front edge of the side surface, the rearward-facing surface facing rearward in the front-rear direction of the vehicle and outward in the vehicle width direction;
- a front side surface (i) connected to an outward edge of the rearward-facing surface in the vehicle width direction and (ii) extending inward in the vehicle width direction from the outward edge of the rearward-facing surface, the front side surface facing forward in the front-rear direction of the vehicle and outward in the vehicle width direction;
- a front upper surface (i) connected to an upper edge of the front side surface and (ii) extending inward in the vehicle width direction from the upper edge of the front side surface, the front upper surface inclined upward from a front side to a rear side;
- a front lower surface (i) connected to a lower edge of the front side surface and (ii) extending inward in the vehicle width direction from the lower edge of the front side surface, the front lower surface facing downward;
- an upper hood disposed above the side surface and protruding outward in the vehicle width direction from the side surface, the upper hood having an eaves shape covering an upper side of the oblique forward-facing camera and an upper side of the oblique rearward-facing camera, an upper surface of the upper hood inclined downward from the front side to the rear side, the upper surface of the upper hood inclined downward toward the outward direction in the vehicle width direction, the upper surface of the upper hood being connected to the front upper surface; and
- a lower hood disposed below the side surface and protruding outward in the vehicle width direction from the side surface, the lower hood having an eaves shape covering a lower side of the oblique forward-facing camera and a lower side of the oblique rearward-facing camera, a lower surface of the lower hood facing downward, the lower surface of the lower hood being connected to the front lower surface, wherein the oblique forward-facing camera is disposed at the side surface, and wherein the oblique rearward-facing camera is disposed at the rearward-facing surface.

15. The vehicular camera unit according to claim 14, wherein the side surface is located outward in the vehicle width direction relative to the front fender.

16. The vehicular camera unit according to claim 15, wherein a connection between the front upper surface and the upper surface of the upper hood forms a ridge that is located most upwardly on an upper surface of the housing.

17. The vehicular camera unit according to claim 16, wherein an amount of protrusion of the upper hood in the vehicle width direction decreases toward the rear side, and
wherein an amount of protrusion of the lower hood in the vehicle width direction decreases toward the rear side.

18. The vehicular camera unit according to claim 17, wherein, when viewed from above, an outward end of the lower hood in the vehicle width direction is located outward in the vehicle width direction relative to an outward end of the upper hood in the vehicle width direction.

19. The vehicular camera unit according to claim 18, wherein a point most outwardly located in the vehicle width direction on a top surface of the camera housing is located at the connection between the front upper surface and the upper surface of the upper hood.

20. The vehicular camera unit according to claim 19, wherein a distance from the point to a front end of the camera housing is shorter than a distance from the point to a rear end of the housing.

* * * * *